US011007407B2

United States Patent
Hwang

(10) Patent No.: US 11,007,407 B2
(45) Date of Patent: May 18, 2021

(54) GAMIFICATION BALANCE EXERCISE SYSTEM

(71) Applicant: Strong Friend Inc., Busan (KR)

(72) Inventor: Se Don Hwang, Busan (KR)

(73) Assignee: Strong Friend Inc., Busan (KR)

( * ) Notice: Subject to any disclaimer, the term of this patent is extended or adjusted under 35 U.S.C. 154(b) by 104 days.

(21) Appl. No.: 16/381,301

(22) Filed: Apr. 11, 2019

(65) Prior Publication Data
US 2020/0023239 A1 Jan. 23, 2020

(30) Foreign Application Priority Data
Jul. 20, 2018 (KR) .................. 10-2018-0084723

(51) Int. Cl.
*A63B 24/00* (2006.01)
*A63B 26/00* (2006.01)
(Continued)

(52) U.S. Cl.
CPC ...... *A63B 24/0087* (2013.01); *A63B 21/0085* (2013.01); *A63B 21/4033* (2015.10); *A63B 24/0062* (2013.01); *A63B 26/003* (2013.01); *A63B 71/0619* (2013.01); *A63F 13/211* (2014.09); *A63B 2024/0096* (2013.01); *A63B 2220/18* (2013.01); *A63B 2220/833* (2013.01)

(58) Field of Classification Search
CPC ..... A63B 26/003–2026/006; A63B 2024/0096
See application file for complete search history.

(56) References Cited

U.S. PATENT DOCUMENTS

| 4,801,140 A * | 1/1989 | Bergeron ........... A63B 21/0004 280/87.01 |
| 6,419,586 B1 * | 7/2002 | Chiu ..................... A63B 22/18 472/135 |

(Continued)

FOREIGN PATENT DOCUMENTS

| JP | 3422958 B2 | 7/2003 |
| JP | 2010-267199 A | 11/2010 |

(Continued)

OTHER PUBLICATIONS

International Search Report for PCT/KR2019/003349 dated Jul. 4, 2019 from Korean Intellectual Property Office.
(Continued)

*Primary Examiner* — Jennifer Robertson
(74) *Attorney, Agent, or Firm* — Paratus Law Group, PLLC

(57) ABSTRACT

A gamification balance exercise system including: a balance board in which a central axis is continuously changed while user's feet are seated; a gyro sensor which is installed in the balance board to detect a slope of the balance board; a communication module which transmits slope data measured by the gyro sensor; a game application which receives and analyzes the slope data to classify the analyzed slope data into direction and acceleration data and moves a character in a predetermined game content based on the direction and acceleration data; and a display which is embedded with the game application and displays the game content and the movement of the character.

3 Claims, 6 Drawing Sheets

(51) Int. Cl.
*A63B 71/06* (2006.01)
*A63B 21/008* (2006.01)
*A63F 13/211* (2014.01)
*A63B 21/00* (2006.01)

(56) References Cited

U.S. PATENT DOCUMENTS

| | | | | |
|---|---|---|---|---|
| 8,313,378 B1* | 11/2012 | Snyder | ................... | A63F 13/245 463/36 |
| 2002/0103032 A1* | 8/2002 | Chiu | ...................... | A63B 22/18 472/26 |
| 2005/0137067 A1* | 6/2005 | Kemery | ................. | B29C 65/02 482/140 |
| 2009/0189854 A1* | 7/2009 | Schwanecke | ...... | A63B 21/0004 345/156 |
| 2009/0303179 A1* | 12/2009 | Overholt | ................ | H04N 7/185 345/156 |
| 2010/0087300 A1* | 4/2010 | Pratson | .............. | A63B 23/0458 482/142 |
| 2012/0139727 A1* | 6/2012 | Houvener | .......... | A63B 71/0622 340/540 |
| 2013/0017937 A1* | 1/2013 | Guarrasi | ................ | A63B 22/18 482/142 |
| 2014/0162859 A1* | 6/2014 | Cheng | ................... | A63B 21/05 482/142 |
| 2014/0371041 A1* | 12/2014 | Terpstra | ................. | A63B 22/18 482/146 |
| 2017/0072266 A1* | 3/2017 | Sasaki | ..................... | A63F 13/65 |
| 2017/0291069 A1* | 10/2017 | Zakariasen | .......... | A63B 26/003 |
| 2018/0200569 A1* | 7/2018 | Blitstein | ............... | A63B 26/003 |
| 2018/0264321 A1* | 9/2018 | Nir | .......................... | A63F 13/22 |
| 2019/0091510 A1* | 3/2019 | Wallace | ............... | A63B 26/003 |
| 2020/0016454 A1* | 1/2020 | Osti | ....................... | A63B 22/18 |

FOREIGN PATENT DOCUMENTS

| | | |
|---|---|---|
| KR | 10-1254588 B1 | 4/2013 |
| KR | 10-1464291 B1 | 11/2014 |
| KR | 10-2018-0077947 A | 7/2018 |

OTHER PUBLICATIONS

Korean Office Action for related KR Application No. 10-2018-0084723 dated Jul. 9, 2019 from Korean Intellectual Property Office.

Written Opinion of the International Searching Authority for PCT/KR2019/003349 dated Jul. 4, 2019 from Korean Intellectual Property Office.

* cited by examiner

GAMIFICATION BALANCE EXERCISE SYSTEM

CROSS-REFERENCE TO PRIOR APPLICATION

This application claims priority to Korean Patent Application No. 10-2018-0084723 (filed on Jul. 20, 2018), which is hereby incorporated by reference in its entirety.

BACKGROUND

The present invention relates to a gamification balance exercise system and more particularly, to a gamification balance exercise system in which a user can move left, right, front, and back on a mobile game through changes in x and y-axis values obtained through the movement by inserting a gyro sensor into a balance board made so that a central axis is unstable to be continuously changed, thereby doing exercise through more exciting balance training.

Globally, there is an increasing socio-economic problem with obese children due to eating more and moving less. According to the World Health Organization (WHO), the number of obese children in the world, which was 11 million in 1975, has risen more than 10 times to 124 million in 2016. In addition, 68% of adolescent obesity leads to adult obesity, and in the United States, 5% to 7% of total medical costs have been spent on treating obesity-related diseases every year, and it was found that additional cost of the enterprise was $800 at the time of employing one obese worker.

Meanwhile, a research team from the university of Leicester, UK, has analyzed large-scale genetic data of about 200,000 or more people, and as a result, it was investigated that as a height was increased by 6.3 cm, the risk of heart disease was decreased by 13.5%, and thus it can be seen that the risk of heart disease in a person with a height of 152 cm is about 32% higher than that in a person with a height of 168 cm.

However, accessibility to physical activity or exercise is low because of education centering on academic achievement and an increase in PC and mobile games, and as a result, a new exercise equipment that can be always nearly enjoyed is required.

In particular, a balancing exercise for children and adolescents has a variety of advantages such as inducing proper growth during the growing period, even development of muscles, preventing obesity, and promoting sound thinking. The balancing exercise is done while the central axis is moved or unstable, so that a neuromuscular function is improved, the body is activated due to improvement of muscles, tendons, ligaments, and quickness and muscular endurance are improved.

When describing prior arts for a gamification exercise system, in Korean Patent Registration No. 10-1254588, there is disclosed an exercising apparatus linked with a functional game which includes a terminal unit which is installed with game software and includes an operating unit by which a user can play games; and an exercising unit which is linked with the game software to conduct the game according to the input of user's movement, so that the user may play games using at least one of the terminal unit and the exercising unit, a character allocated to the user is provided in the game software, and the user may change a state of the character by the exercising unit. According to the prior art, it is advantageous that the user may continuously maintain an interest in the exercise unit to promote the exercise desire, but since the exercising unit is usable at a sports center such as a health club other than a general exercising equipment, it is disadvantageous that it is difficult to use the exercising unit when the user wants to do exercise at any time in a private and comfortable space such as a house.

PRIOR ART DOCUMENT

Patent Document (Patent Document 1) Korean Patent Registration No. 10-1254588 (Apr. 15, 2013)

SUMMARY

In order to solve the problems in the prior art described above, an object of the present invention is to provide a gamification balance exercise system capable of enjoying and doing exercise by interlocking a gamification mobile application with a function exercise device so as to more excitingly enjoy nearly the exercise.

Further, another object of the present invention is to provide a gamification balance exercise system including a balance board which is optimally designed for balance exercise to provide instability and elasticity.

Further, yet another object of the present invention is to provide a gamification balance exercise system which may be used for height growth, rehabilitation and treatment as well as physical function improvement by excitingly stimulating exercise motivation.

Objects to be solved by the present invention are not limited to the aforementioned objects and other unmentioned objects to be solved by the present invention will be clearly understood by those skilled in the art from the following description.

According to an aspect of the present invention, there is provided a gamification balance exercise system including: a balance board in which a central axis is continuously changed while user's feet are seated; a gyro sensor which is installed in the balance board to detect a slope of the balance board; a communication module which transmits slope data measured by the gyro sensor; a game application which receives and analyzes the slope data to classify the analyzed slope data into direction and acceleration data and moves a character in a predetermined game content based on the direction and acceleration data; and a display which is embedded with the game application and displays the game content and the movement of the character, wherein in use, when the user does the balance exercise on the balance board, the same movement as the user's movement is applied to the character in the game content by the gyro sensor to grant an interest in the balance exercise effective for development of a lower body.

When the user does the balance exercise on the balance board, the same movement as the user's movement may be applied to the screen movement of the game content displayed on the display by the gyro sensor to further grant an interest in the balance exercise effective for development of a body.

The balance board may include a planar seating table on which a user stands on user's feet for balance exercise; a center changing part which is coupled to a lower portion of the seating table and made of an ethylene-vinyl acetate (EVA) copolymer; and an air tube which is inserted into the center changing part to increase the instability of the balance board, wherein when the central axis of the balance board is moved, an area in which the center changing part is in contact with the ground surface is designed to be smaller than the area of the seating table.

The seating table may have a first groove provided thereon and a second groove into which the gyro sensor is inserted and may further include a sensor pad which is detachable to the first groove and is made of a material having hardness lower than that of the seating table to provide the instability of the seated foot portion, wherein in assembling, the sensor pad may be attached to the second groove after the gyro sensor is inserted into the second groove.

The sensor pad may include a first surface having a first embossed pattern; and a second surface opposed to the first surface and having a second embossed pattern different from the first embossed pattern, wherein in use, the first surface or the second surface of the sensor pad is attached to the first groove to be exposed on the seating table and the surface contacting the user's feet is selected from the first embossed pattern or the second embossed pattern.

By the solution of the problems, the gamification balance exercise system of the present invention has effects of allowing a user to easily learn a balance exercising method and excitingly do exercise by providing balance exercise for health management of children, adolescents, and elderly people as well as general public through a game application installed in a mobile device.

Further, the gamification balance exercise system of the present invention has effects of having a great effect on height growth and giving healthy stimulation to joints by using movement of the balance board in which an instable central axis is moved to activate muscles, tendons, and ligaments around knee joints, ankle joints, and hip joints of the lower limb.

Further, the gamification balance exercise system of the present invention has an effect of enhancing performance and preventing injuries of athletes by improving a core function.

DETAILED DESCRIPTION

Specific matters including problems to be solved for the present invention, a solving means of the problems, and the effect of the invention for the present invention are included in exemplary embodiments and drawings to be described below. Advantages and/or features of the present invention, and a method for achieving the advantages and/or features will become obvious with reference to embodiments to be described below in detail together with the accompanying drawings.

Gamification is a process of solving problems by applying a mechanism of a body game to a game external field to provide exercise for health by applying the pleasure of the game to balance training in the present invention.

Figure 1:
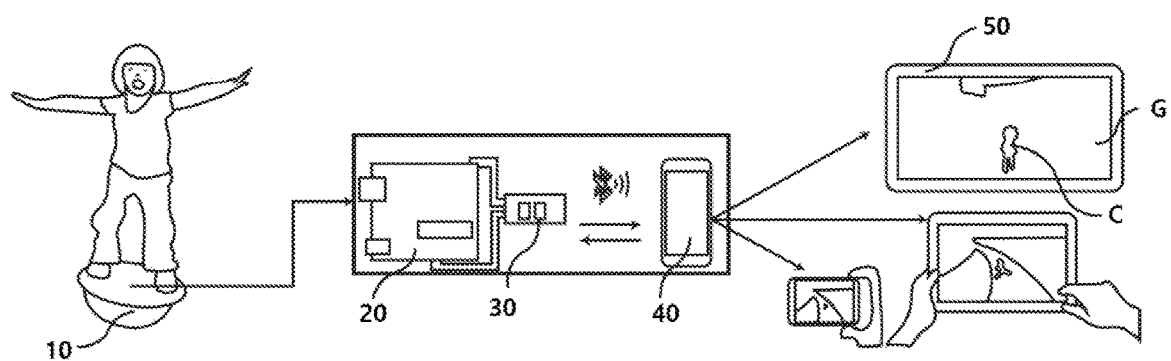
FIG. 1 is an overall configuration diagram of a gamification balance exercise system integrated with a mobile game information technology according to the present invention.

A gamification balance exercise system according to the present invention, as illustrated in FIG. 1, includes a balance board 10 of which a central axis is continuously changed while a user's foot is fixed, a gyro sensor 20 which is installed in the balance board 10 to sense a slope of the balance board 10, a communication module 30 which transmits slope data measured by the gyro sensor 20, a game application 40 which receives and analyzes the slope data to classify the analyzed slop data into direction and acceleration data and moves a character C in a predetermined game content G based on the direction and acceleration data, and a display 50 which is embedded with the game application 40 and displays the game content G and the movement of the character C.

The balance board 10 is a structure in which a center of a user standing on the balance board 10 is continuously instable, so that the user needs to have coordination between the muscles to keep continuously balance. In order to detect the movement of the user, the gyro sensor 20 for detecting the movement of the balance board 10 moving in the same manner as the movement of the user is installed in the balance board 10. Here, the detected motion is a slope signal value of the gyro sensor 20, which is a principle of increasing the interest of the user, as a structure in which a partial configuration of the game content G is equally changed according to the movement of the user by transmitting and then analyzing the slope signal value to classify the slope signal value into direction and acceleration data and reflecting the classified direction and acceleration data to the game content G.

Figure 2:
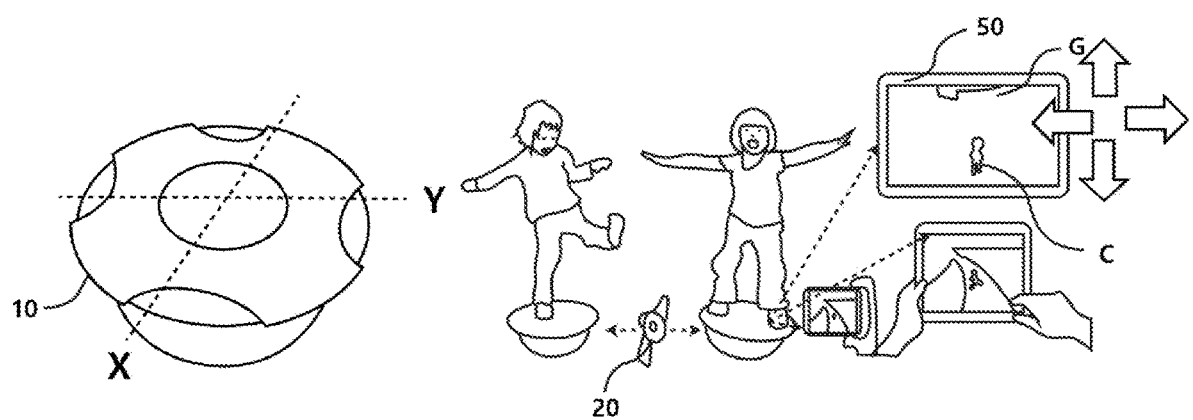
FIG. 2 is a diagram illustrating a method of applying exercise of a gamification balance exercise system according to an embodiment of the present invention to a game.

Accordingly, the gamification balance exercise system according to an embodiment of the present invention, as illustrated in FIG. 2, may be configured to grant an interest in balance exercise effective for development of a lower body by applying the same movement as the user's movement to the character C in the game content G by the gyro sensor 20 when the user does the balance exercise on the balance board 10 in use. Specifically, the character C may also be moved on the basis of the x-axis and the y-axis in accordance with the x-axial and y-axial movement of the gyro sensor 20 inserted into the balance board 10. That is, the character C may be moved by the movement of the gyro sensor 20 inserted into the balance board 10, so that the balance board 10 may be applied to character movement in all game contents.

Figure 3:
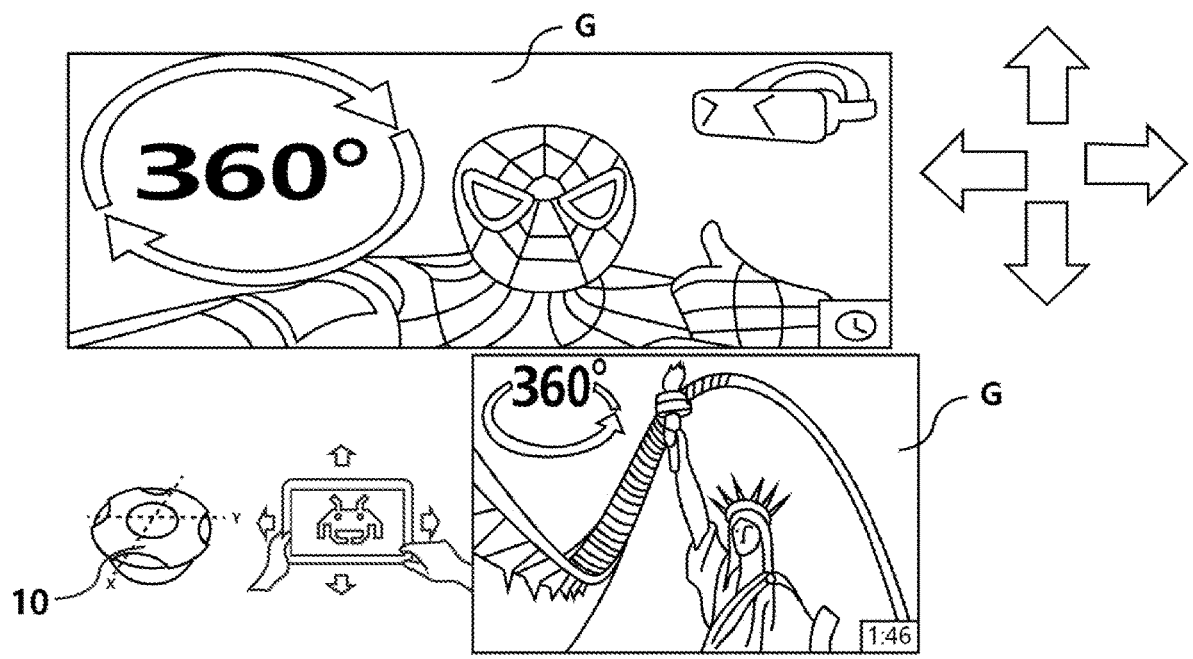
FIG. 3 is a diagram illustrating a method of applying exercise of a gamification balance exercise system according to another embodiment of the present invention to a game.

Further, a gamification balance exercise system according to another embodiment of the present invention, as illustrated in FIG. 3, may be configured to further grant an interest in balance exercise effective for development of a body by applying the same movement as the user's movement to the screen movement of the game content G displayed on the display 50 by the gyro sensor 20 when the user does the balance exercise on the balance board 10. Specifically, a moving picture replayed in the game content is moved to the left and right by the variation of x, y values of the gyro sensor 20 inserted into the balance board 10, so that the balance board 10 may be applied to screen movement of a 360° video or VR video.

In order to implement the aforementioned gamification, the gyro sensor 20 may be a sensor capable of measuring a slope having a size that can be inserted into the balance board 10, and is not limited to a specific type. In addition, the communication module 30 transmits a slope signal value to the game application 40, and means such as Bluetooth, Wi-Fi, etc. may be applied. In addition, the game application 40 is a game that can be installed in a mobile terminal, and a type thereof is not limited. In addition, a device in which the game application 40 is installed may be a device capable of transmitting data of the gyro sensor 20 through the communication module 30 as well as mobile terminals. Further, the display 50 may be a mobile terminal installed with the game application 40, or a means capable of outputting the game content C in addition to the mobile terminal installed with the game application 40.

Meanwhile, the balance board 10 of the gamification balance exercise system according to the present invention adopts a principle of improving a neuromuscular function, improving functions of the body by activating muscles, tendons, and ligaments, and improving quickness and muscular endurance when the central axis is variously changed on an unstable ground surface during exercise.

Figure 4:
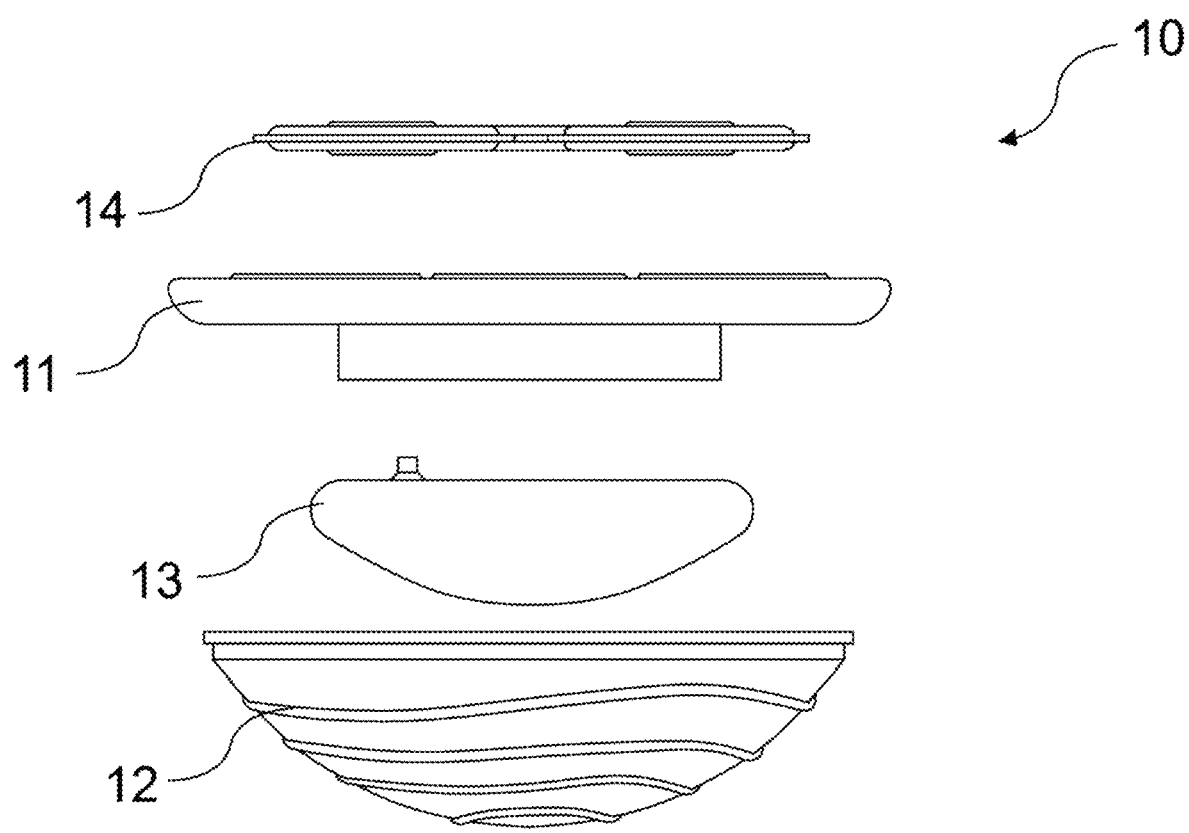
FIG. 4 is a configuration diagram illustrating a detailed structure of a balance board of a gamification balance exercise system according to the present invention.

As illustrated in FIG. 4, the balance board 10 according to the present invention includes a planar seating table 11 on which a user can stand on user's feet for balance exercise at an upper portion, a center changing part 12 coupled to a lower portion of the seating table 11, and an air tube 13 inserted into the center changing part 12 to increase the instability of the balance board 10. Here, in the balance board 10, the center changing part 12 is provided so that an area where the center changing part 12 is in contact with the ground surface is smaller than the area of the seating table 11 when the central axis of the balance board 10 moves. As a result, the balance board is manufactured so that when the feet are grounded on the seating table 11, the central axis is continuously changed and the contact surface with the ground surface is unstably shaken.

The center changing part 12 may be made of an ethylene-vinyl acetate (EVA) copolymer so as not to be hurt even when hitting, unlike general materials with high hardness.

The air tube 13 is inserted in a form capable of adjusting separately the air pressure so as to provide instability of the lower body such as ankle and knee. As a result, if the user keeps the balance, the functions of user's ankle joints, knee joints, and hip joints may be improved.

A specific portion where the user's feet are seated on the seating table 11 is made of a material having relatively low hardness compared to other portions, so that instability of the foot grounding portion is sufficiently provided.

Figure 5:
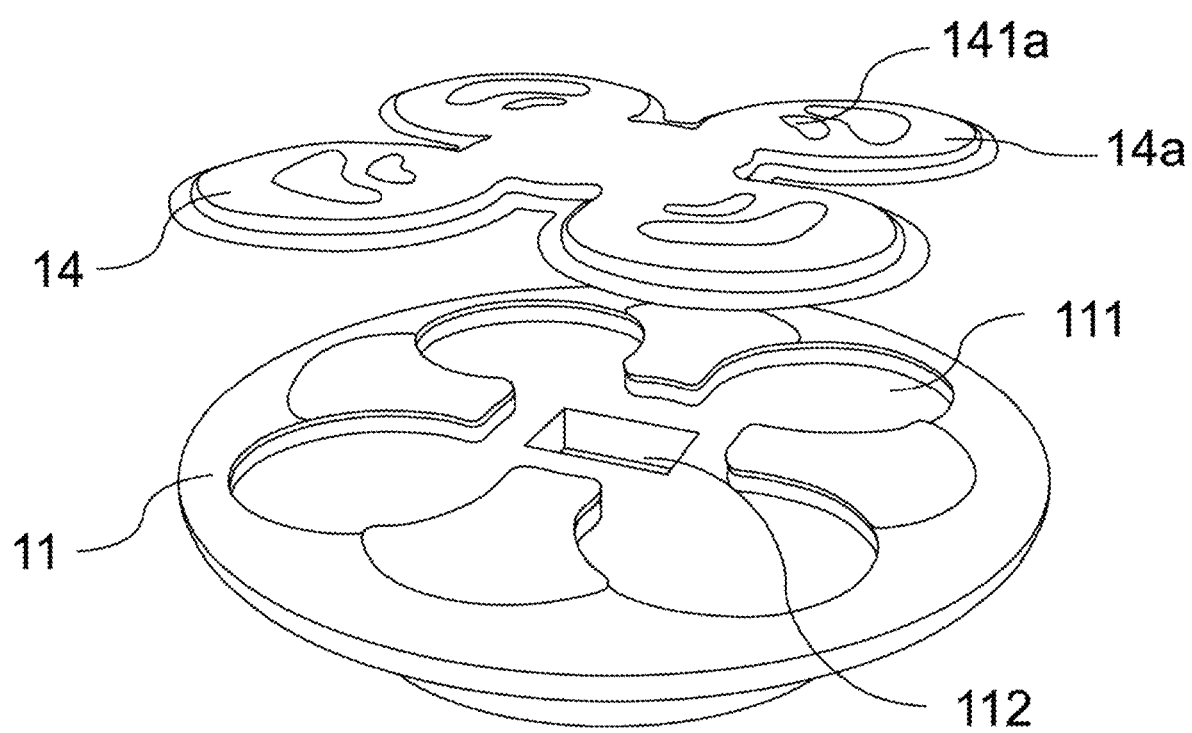
FIG. 5 is a perspective view of the balance board in the gamification balance exercise system according to the present invention when viewed from the top.

To this end, as illustrated in FIG. 5, the seating table 11 has a first groove 111 provided thereon and a second groove 112 into which the gyro sensor 20 can be inserted, and may include a sensor pad 14 which may be detachable to the first groove 111 and made of a material having hardness lower than that of the seating table 11 to provide instability of the seated foot portion. As a result, the user's stability may be secured and an exercising effect may be increased by a method of increasing instability of the ground surface of the feet without structurally increasing a movable range itself of the balance board 10.

Figure 6:
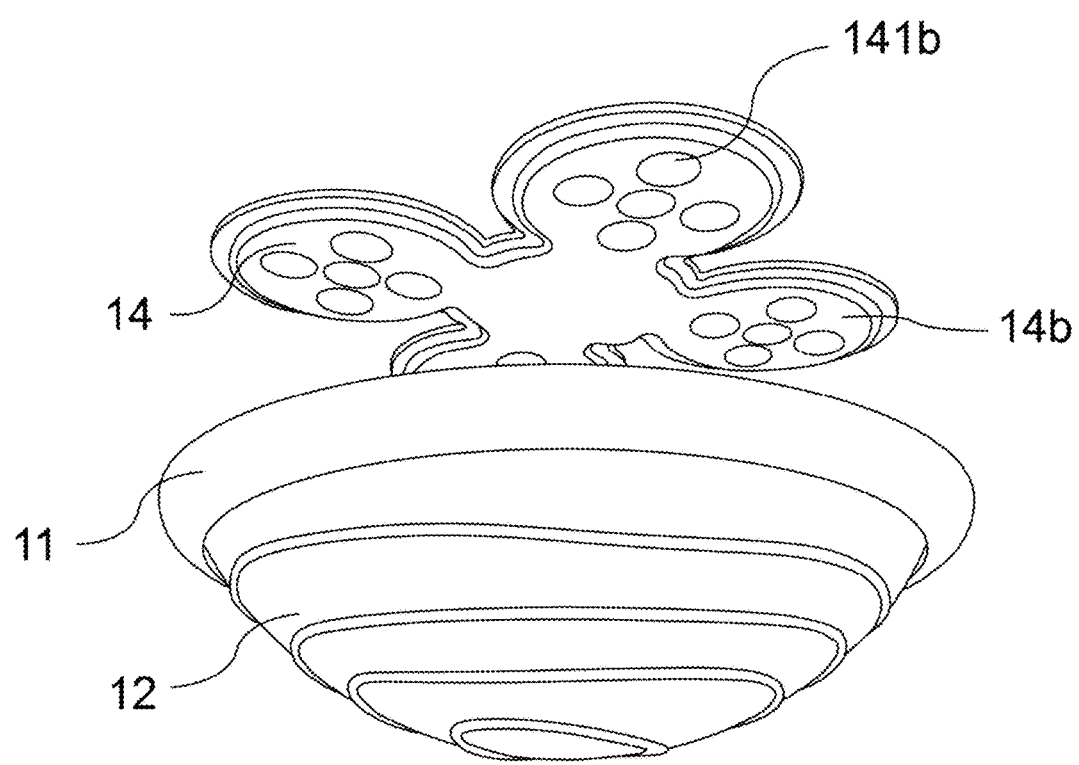
FIG. 6 is a perspective view of the balance board in the gamification balance exercise system according to the present invention when viewed from the bottom.

Further, as illustrated in FIGS. 5 and 6, the sensor pad 14 includes a first surface 14a having a first embossed pattern 141a and a second surface 14b opposed to the first surface 14a and having a second embossed pattern 141b different from the first embossed pattern 141a. Accordingly, when the user does the exercise, the first surface 14a or the second surface 14b of the sensor pad 14 is attached to the first groove 111 to be exposed on the seating table 11 and the surface contacting the user's feet may be selected from the first embossed pattern 141a or the second embossed pattern 141.

Figure 7:
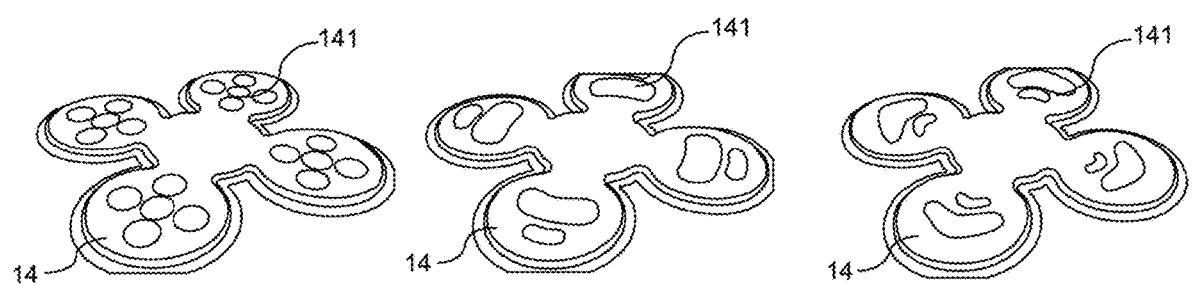
FIG. 7 is a diagram illustrating various examples of an embossed pattern provided on a sensor pad in the gamification balance exercise system according to the present invention.

As illustrated in FIG. 7, the first and second embossed patterns 141a and 141b may be formed in a circular type, a round type, or a boomerang type. The circular type is provided by locating protruding portions intensively at a sole contacting portion to obtain the effect of acupressure and stimulation of growth plate e round type is provided with protruding portions wider than the circular type to obtain an buffer effect by amplifying the cushioning effect so that the sole is comfortable, and the boomerang type has the same effect that the feet are felt as the round type, but has a more sporty image to enhance the aesthetic sense.

Through the sensor pads 14 having different embossed patterns on both sides, the user can use the sensor pads 14 in a customized manner according to the exercise environment to obtain a body improving effect on the sole in addition to the interest.

Meanwhile, in a method of assembling the balance board 10 having the aforementioned structure, first, the air tube 13 is inserted into the center changing part 12 and the seating table 11 is covered and coupled to the upper portion. The balance board 10 may be easily assembled by inserting the gyro sensor 20 into the second groove 112 of the seating part 11 and covering the sensor pad 14 on the upper portion. The user may easily replace or repair the gyro sensor 20 when the gyro sensor 20 is broken or replaced through such an easy assembling structure.

Figure 8:
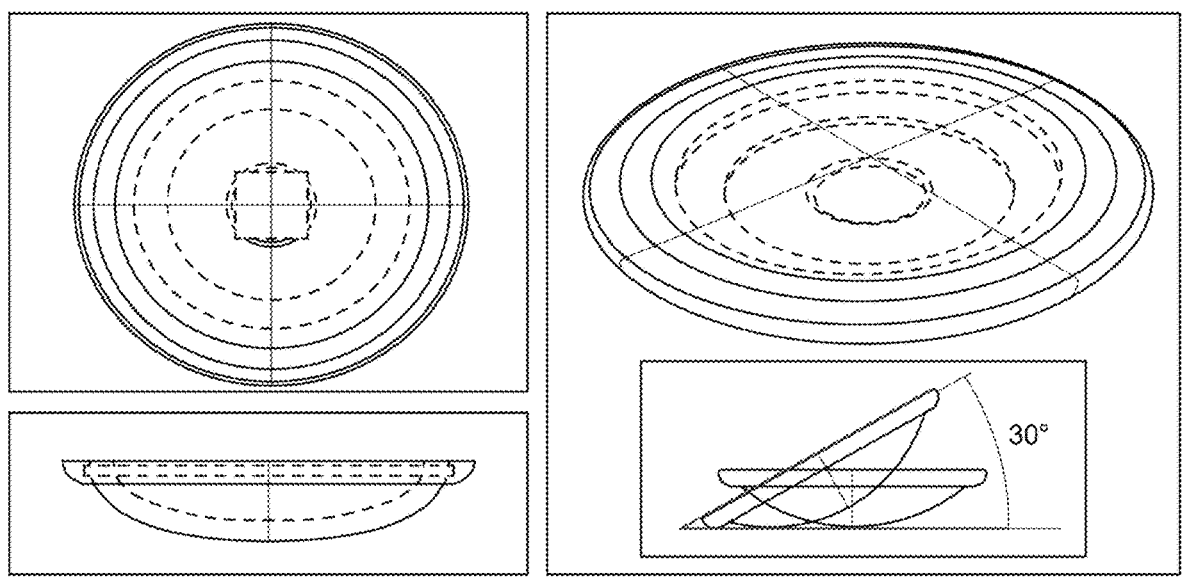
FIG. 8 is a diagram illustrating a balance board which provides an optimal angle for ankle joint motion in the gamification balance exercise system according to the present invention.

In addition, an unstable exercise apparatus that its central axis is always changed may be injured beyond the moving range of the ankle joints when warm-up exercise is not sufficient. In order to prevent the injury, as illustrated in FIG. 8, the balance board 10 is provided to secure an optimal angle in the motion of the ankle joints by adjusting the size of the balance board 10, that is, an angle between a diameter of the seating part 11 and a height of the balance board 10. According to a preferred embodiment of the present invention, the balance board 10 is configured so that a maximum angle between the seating table 11 and the ground surface is 25° to 35°.

That is, the balance board 10 having the aforementioned structure is configured so that the relatively rigid seating part 11 is easy to ground the foot, and the center changing part 12 contacting the ground surface has high instability due to the air tube 13 inserted therein so that the central axis moves, and as a result, coordination of large muscles and small muscles is continuously conducted for balancing.

Accordingly, the balance board 10 has instability in which the central axis is variously moved to be used for stimulation of muscles, tendons, ligaments around the knee joints, ankle joints, and hip joints of the lower limbs which have the greatest influence on the height growth existing in the bones throughout the body and helping to stabilize weak muscles, tendons and ligaments of athletes or elderly people. In addition, the balance training itself has an effect of inducing consumption of a lot of calories to be of help even to diet.

The gamification balance exercise system according to the present invention may not only provide optimal balance training to the user through the balance board, but also make the user feel fun for training and help in improving the functions of the user's body, particularly, the core and the lower limb.

In addition, the gamification balance exercise system according to the present invention may be applied to a healthcare system including nutrition and exercise prescription, and medical care by processing body data that may be collected when a user does exercises like playing a game. Furthermore, an IoT healthcare station may be constructed by linking functional healthcare exercise products with a platform.

Further, the gamification balance exercise system according to the present invention may be applied to healthcare fields such as hospitals, sports facilities, and health insurance fields which are mainly used by the user by providing a ranking of the quantity of motion through the game or saving points to provide discounts and applied to construct a network capable of providing health and medical information.

As described above, it will be understand to those skilled in the art that a technical configuration of the present invention can be easily executed in other detailed forms without changing the technical spirit or an essential feature thereof.

Therefore, it should be understood that the above-described exemplary embodiments are illustrative in all aspects and do not limit the present invention. The scope of the present invention is represented by claims to be described below rather than the detailed description, and it is to be interpreted that the meaning and the scope of the claims and all the changes or modified forms derived from the equivalents thereof are included within the scope of the present invention.

EXPLANATION OF REFERENCE NUMERALS AND SYMBOLS

10: Balance board
11: Seating part
111: First groove
112: Second groove
12: Center changing part
13: Air tube
14: Sensor pad
14a: First surface of sensor pad
14b: Second surface of sensor pad
141: Embossed pattern
141a: First embossed pattern of first surface
141b: Second embossed pattern of second surface
20: Gyro sensor
30: Communication module
40: Game application
50: Display
G: Game content
C: Character

What is claimed is:

1. A gamification balance exercise system comprising:
a balance board on which user's feet are seated for balance exercise, and including:
a planar seating table including a first groove provided thereon and a second groove provided in the first groove;
a sensor pad which seats on the seating table and is made of a material having hardness lower than that of the seating table to provide instability to the user's feet seated thereon;
a center changing part which is coupled to a lower portion of the seating table and made of an ethylene-vinyl acetate (EVA) copolymer, and which contacts with a floor during the user's balance exercise; and
an air tube which is inserted into the center changing part to increase instability of the balance board during the user's balance exercise,
wherein when a central axis of the balance board is moved by the user's balance exercise, an area in which the center changing part is in contact with the floor is designed to be smaller than an area of the seating table;
a gyro sensor which is installed in the second groove to detect a slope of the balance board and is covered by the sensor pad;
a communication module which transmits slope data measured by the gyro sensor;
a game application which receives and analyzes the slope data to classify the analyzed slope data into direction and acceleration data and moves a character in a predetermined game content based on the direction and acceleration data; and
a display which is embedded with the game application and displays the game content and the movement of the character, and
wherein the sensor pad includes:
a first surface having a first embossed pattern; and
a second surface opposite to the first surface and having a second embossed pattern different from the first embossed pattern,
wherein the sensor pad is detachably fitted in the first groove such that any one of the first surface and the second surface is exposed on the seating table and a surface being exposed and contacting the user's feet is selected from the first embossed pattern or the second embossed pattern by the user.

2. The gamification balance exercise system of claim 1, wherein when the user does the balance exercise on the balance board, the same movement as the user's movement is applied to a screen movement of the game content displayed on the display by the gyro sensor to grant an interest in the balance exercise effective for development of a body.

3. The gamification balance exercise system of claim 1, wherein when the user does the balance exercise on the balance board, the same movement as the user's movement is applied to the character in the game content by the gyro sensor to grant an interest in the balance exercise effective for development of a lower body.

* * * * *